(12) United States Patent
Lunttila et al.

(10) Patent No.: US 9,313,006 B2
(45) Date of Patent: Apr. 12, 2016

(54) METHODS AND APPARATUS FOR RESOURCE ELEMENT MAPPING

(71) Applicant: Nokia Corporation, Espoo (FI)

(72) Inventors: Timo E. Lunttila, Espoo (FI); Esa T. Tiirola, Kempele (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 127 days.

(21) Appl. No.: 14/244,089

(22) Filed: Apr. 3, 2014

(65) Prior Publication Data

US 2014/0301300 A1    Oct. 9, 2014

Related U.S. Application Data (60) Provisional application No. 61/808,339, filed on Apr. 4, 2013.

(51) Int. Cl.
| | | |
|---|---|---|
| *H04L 1/00* | (2006.01) | |
| *H04L 5/00* | (2006.01) | |
| *H04L 1/18* | (2006.01) | |

(52) U.S. Cl.
CPC ............ *H04L 5/0053* (2013.01); *H04L 1/1812* (2013.01); *H04L 5/0055* (2013.01)

(58) Field of Classification Search
CPC ..... H04W 72/04; H04W 72/05; H04W 72/06; H04L 47/10; H04L 47/11; H04L 47/12; H04L 47/13; H04L 47/14

USPC .......................... 370/329, 330, 229, 230, 235
See application file for complete search history.

(56) References Cited

U.S. PATENT DOCUMENTS

2013/0201926 A1*  8/2013  Nam ................... H04L 1/1685
                                                         370/329

OTHER PUBLICATIONS

Ericsson et al.; "Views on ePHICH"; R1-121025; 3GPP TSG-RAN WG1 #68bis; Jeju, Republic of Korea; Mar. 26-30, 2012; whole document (1 page).

Samsung; "ePHICH design for Rel-11"; R1-122258; 3GPP TSG RAN WG1 Meeting #69; Prague, Czech Republic; May 21-25, 2012; whole document (5 pages).

3GPP TS 36.211 V8.9.0; "3rd Generation Partnership Project; Technical Specification Group Radio Access Network; Evolved Universal Terrestrial Radio Access (E-UTRA); Physical Channels and Modulation (Release 8)"; Dec. 2009; whole document (83 pages).

* cited by examiner

*Primary Examiner* — Dady Chery
(74) *Attorney, Agent, or Firm* — Harrington & Smith (57) ABSTRACT

Improved mechanisms for using enhanced physical downlink control channel (EPDCCH) and enhanced physical hybrid indicator automated repeat request indicator channel (EPHICH) resources are described. A physical resource block (PRB) of an EPDCCH is specified and one or more EPHICH code blocks, which may also be referred to as an EPHICH resource element group (EPREG), are defined. One or more of the EPREGs is mapped into the EPDDCH PRB.

20 Claims, 6 Drawing Sheets

FIG.1

|      | EPHICH GROUP | | | | | | | |
|------|---|---|---|---|---|---|---|---|
| PRB0 | 0 | 2 | 4 | 6 | 11 | 13 | 15 | 20 | 22 |
| PRB1 | 1 | 3 | 5 | 7 | 9  | 14 | 16 | 18 | 23 |
| PRB2 | 2 | 4 | 6 | 8 | 10 | 12 | 17 | 19 | 21 |
| PRB3 | 0 | 5 | 7 | 9 | 11 | 13 | 15 | 20 | 22 |
| PRB4 | 1 | 3 | 8 | 10| 12 | 14 | 16 | 18 | 23 |
| PRB5 | 2 | 4 | 6 | 9 | 13 | 15 | 17 | 19 | 21 |
| PRB6 | 0 | 5 | 7 | 10| 14 | 16 | 18 | 20 | 22 |
| PRB7 | 1 | 3 | 8 | 10| 12 | 17 | 19 | 21 | 23 |

METHODS AND APPARATUS FOR RESOURCE ELEMENT MAPPING

CROSS-REFERENCE TO RELATED APPLICATIONS

This application claims priority from U.S. Provisional Application No. 61/808,339, filed on Apr. 4, 2013 and incorporated herein by reference in its entirety.

TECHNICAL FIELD

The present invention relates generally to wireless communication. More particularly, the invention relates to improved systems and techniques for assignment of resource elements within a physical resource block.

BACKGROUND

The following definitions will assist in understanding various abbreviations used in this document:
3GPP $3^{rd}$ Generation Partnership Project
ACK Acknowledgement
BER Bit Error Rate
BW Bandwidth
CDM Code Division Multiplexing
CRS Common (Cell-specific) Reference Signal
CSI-RS Channel State Information Reference Signal
CSS Common Search Space
CoMP Collaborative Multi-Point
DCI Downlink Control Information
DL Downlink
DM-RS Demodulation Reference Signal (UE specific)
eCCE enhanced Control Channel Element
eNB enhanced Node B (LTE base station)
EPBCH Enhanced Physical Broadcast Channel
EPDCCH Enhanced Physical Downlink Control Channel
EPHICH Enhanced Physical Hybrid ARQ Indicator Channel
EPREG EPHICH Resource Element Group
eREG enhanced Resource Element Group
FFS For Further Studies
HARQ Hybrid Automatic Repeat Request
HetNet Heterogeneous Network
IMR Interference Measurement Resource
LTE Long Term Evolution
MIB Master Information Block
NACK Negative ACK
NCT New Carrier Type
OFDM Orthogonal Frequency Division Multiplexing
OFMDA OFDM Access
PBCH Physical Broadcast Channel
PCell Primary Cell
PHICH Physical Hybrid ARQ Indicator Channel
PRB Physical Resource Block
PUSCH Physical Uplink Shared Channel
RRC Radio Resource Control
RE Resource Element
REG Resource Element Group
RS Reference Signal
SF Spreading Factor
TDD Time Division Duplexing
UE User Equipment (e.g. Mobile Terminal)
USS User specific Search Space
WG Working Group As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of larger base stations diminishes. In addition, as saturation of available wireless communication frequencies approaches, addition of conventional infrastructure approaches a point of ineffectiveness. Network operators are therefore under constant pressure to improve the efficiency of their use of resources, particularly frequency resources. One important aspect of efficient use of resources is the efficient use of control signaling, and mechanisms such as decreasing the control signaling required and increasing the detectability of control signals can substantially improve communication efficiency.

SUMMARY OF THE INVENTION

In one embodiment of the invention an apparatus comprises at least one processor and memory storing a program of instructions. The memory storing the program of instructions is configured to, with the at least one processor, cause the apparatus to at least define one or more physical resource blocks (PRBs) of an enhanced physical downlink control channel (EPDCCH), define one or more enhanced physical hybrid automatic repeat request indicator channel (EPHICH) groups each comprising one or more EPHICH resource element groups (EPREGs), and map the one or more of the EPREGs into the said one or more PRBs of the EPDCCH, with EPREG to resource element (RE) mapping within one PRB of the EPDCCH being accomplished according to a predefined allocation order.

In another embodiment of the invention an apparatus comprises at least one processor and memory storing a program of instructions. The memory storing the program of instructions is configured to, with the at least one processor, cause the apparatus to at least receive an enhanced physical downlink control channel (EPDCCH) set definition comprising a plurality of physical resource blocks (PRBs), receive signaling indicating a number of enhanced physical hybrid automatic repeat request indicator channel (EPHICH) groups on an EPDCCH set, each EPHICH group comprising a plurality of EPHICH resource element groups (EPREGs), determine the number of EPREGs for each EPHICH group for each of a plurality of PRB pairs defined by the EPDCCH set definition, determine an index of an EPHICH channel including the EPHICH group corresponding to physical uplink shared channel (PUSCH) data associated with the apparatus and, based on the index of the EPHICH channel, identify EPREGs carrying hybrid automatic repeat request (HARQ) information for the apparatus.

In another embodiment of the invention, a method comprises defining one or more physical resource blocks (PRBs) of an enhanced physical downlink control channel (EPDCCH), defining one or more enhanced physical hybrid automatic repeat request indicator channel (EPHICH) groups each comprising one or more EPHICH resource element groups (EPREGs), and mapping the one or more of the EPREGs into the said one or more PRBs of the EPDCCH, with EPREG to resource element (RE) mapping within one PRB of the EPDCCH being accomplished according to a predefined allocation order.

In another embodiment of the invention, a method comprises receiving an enhanced physical downlink control channel (EPDCCH) set definition comprising a plurality of physical resource blocks (PRBs), receiving signaling indicating a number of enhanced physical hybrid automatic repeat request indicator channel (EPHICH) groups on an EPDCCH set, each EPHICH group comprising a plurality of EPHICH resource element groups (EPREGs), determining the number of EPREGs for each EPHICH group for each of a plurality of PRB pairs defined by the EPDCCH set definition, determining an index of an EPHICH channel including the EPHICH group corresponding to physical uplink shared channel (PUSCH) data associated with the apparatus and, based on the index of the EPHICH channel, identifying EPREGs carrying hybrid automatic repeat request (HARQ) information for the apparatus.

In another embodiment of the invention, a computer readable medium stores a program of instructions. Execution of the program of instructions by a process configures the apparatus to at least define one or more physical resource blocks (PRBs) of an enhanced physical downlink control channel (EPDCCH), define one or more enhanced physical hybrid automatic repeat request indicator channel (EPHICH) groups each comprising one or more EPHICH resource element groups (EPREGs), and map the one or more of the EPREGs into the said one or more PRBs of the EPDCCH, with EPREG to resource element (RE) mapping within one PRB of the EPDCCH being accomplished according to a predefined allocation order.

In another embodiment of the invention, a computer readable medium stores a program of instructions. Execution of the program of instructions by a process configures the apparatus to at least receive an enhanced physical downlink control channel (EPDCCH) set definition comprising a plurality of physical resource blocks (PRBs), receive signaling indicating a number of enhanced physical hybrid automatic repeat request indicator channel (EPHICH) groups on an EPDCCH set, each EPHICH group comprising a plurality of EPHICH resource element groups (EPREGs), determine the number of EPREGs for each EPHICH group for each of a plurality of PRB pairs defined by the EPDCCH set definition, determine an index of an EPHICH channel including the EPHICH group corresponding to physical uplink shared channel (PUSCH) data associated with the apparatus and, based on the index of the EPHICH channel, identify EPREGs carrying hybrid automatic repeat request (HARQ) information for the apparatus.

DETAILED DESCRIPTION

Embodiments of the present invention recognize that efficient assignment of control elements within a physical resource block (PRB) can substantially increase communication efficiency. Therefore, one or more embodiments of the invention provide mechanisms for assigning resource elements for the enhanced physical downlink control channel (EPDCCH), and notably the enhanced physical hybrid automatic repeat request indicator channel (EPHICH). Preferred mechanisms suitably minimize the overhead of unused symbols, accommodate existing approaches with minimal impact to standards—for example, embodiments of the invention may be directed to mechanisms that maximize commonality with existing Third Generation Partnership Project (3GPP) technical specification (TS) release 8 to release 11 solutions, from the point of view of functionality, capacity, and performance. Embodiments of the invention may further define spreading within a physical resource block so as to achieve the objectives described above. In addition, embodiments of the invention may provide mechanisms for maintaining orthogonality among spreading codes allocated to the same resource elements in difficult radio environments, such as those characterized by a large delay spread and/or a high UE speed.

In addition, embodiments of the invention are directed toward meeting generic design targets for EPHICH and new carrier type (NCT)—to preserve the basic advantageous properties of NCT in the use of EPHICH. Such targets may include, for example, network energy savings, interference coordination among neighboring cells, and support for heterogeneous networks. In addition, EPHICH should meet or exceed the same basic requirements as prior-art PHICH configurations in terms of performance, which may be expressed as a bit error rate (BER) of $10^{-3}$ or less, capacity, in terms of the number of scheduled users, overhead, and configurability.

Figure 1:
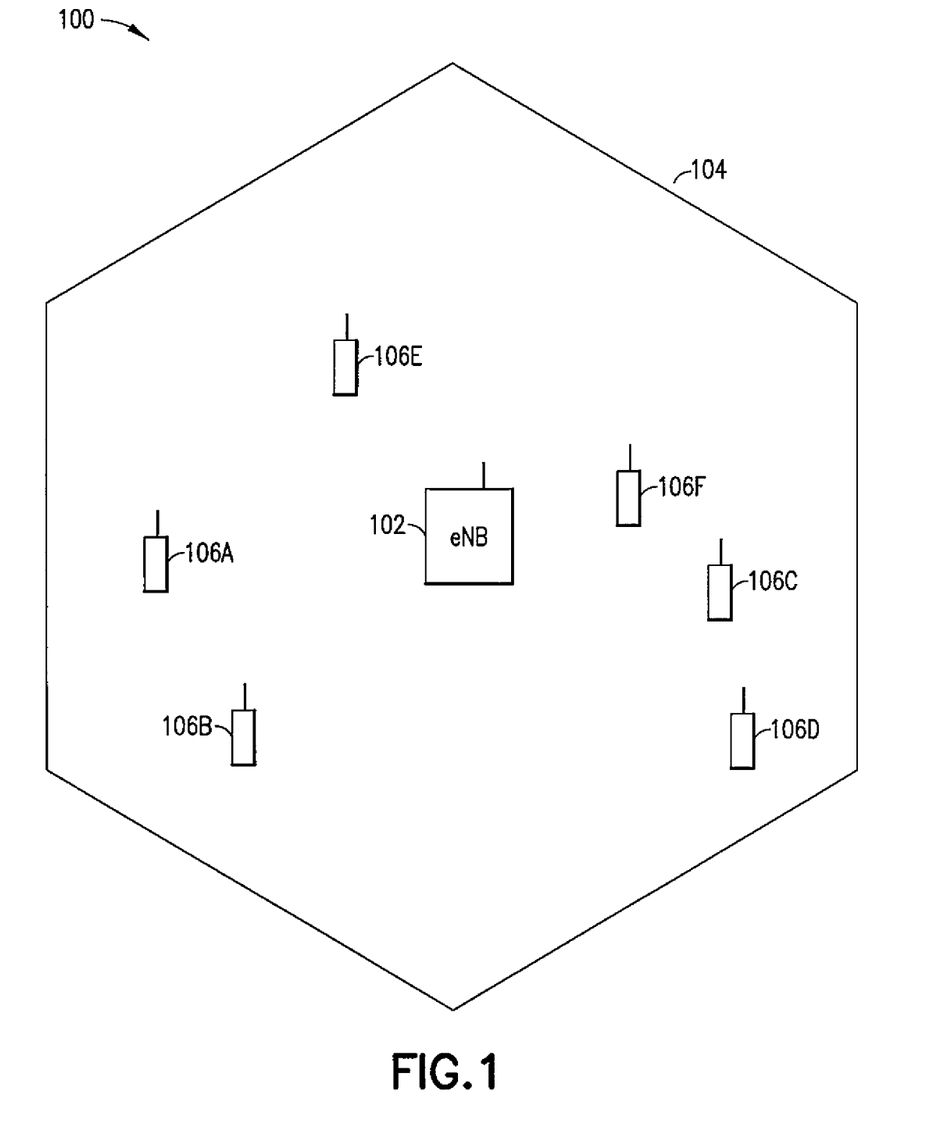
FIG. 1 illustrates a network according to an embodiment of the present invention.

FIG. 1 illustrates a wireless network 100 comprising a base station implemented as an eNodeB (eNB) 102, serving a wireless network cell 104, defined as an area serving a plurality of user devices, implemented as user equipments (UEs) 106A-106F. The eNB 102 uses physical resource blocks for communication with the various UEs, and may employ one or more exemplary embodiments of the invention to manage resource use.

Figure 2:
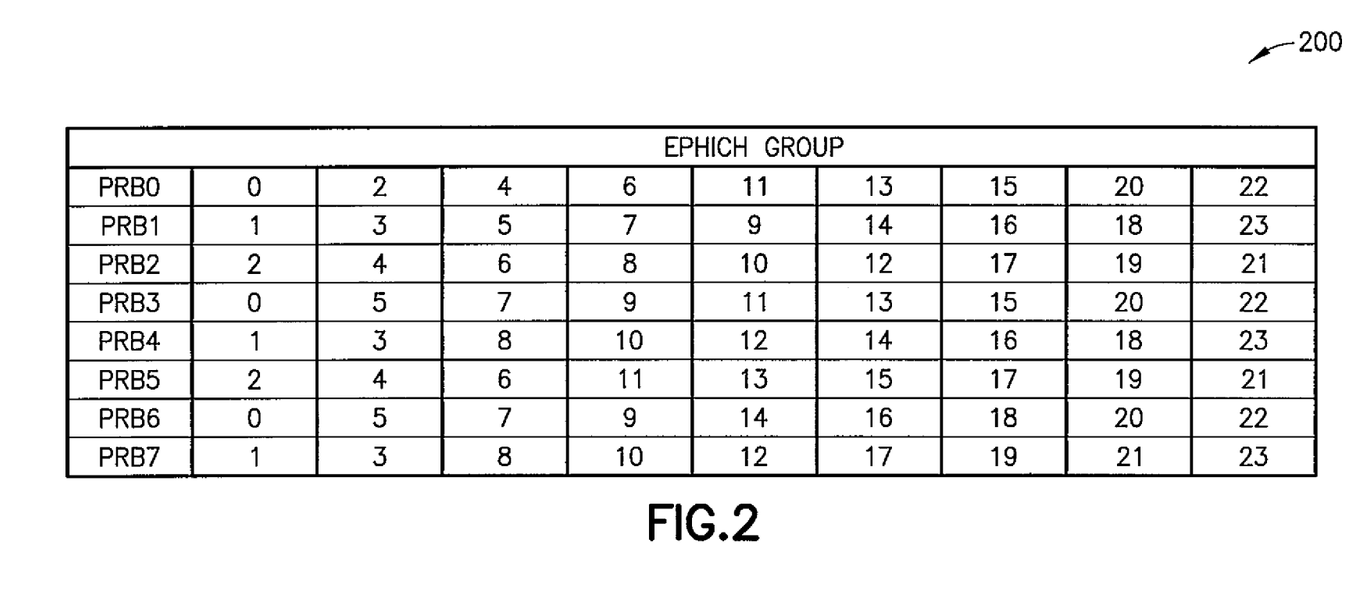
FIG. 2 illustrates a prior-art code mapping arrangement.

FIG. 2 illustrates an exemplary mapping 200 of EPHICH code blocks to physical resource blocks, with three repetitions being used for each EPHICH group and 8 EPDCCH physical resource block pairs being used, but the mapping structure 200 of FIG. 2 does not provide for EPHICH mapping within a physical resource block pair.

Embodiments of the present invention provide mechanisms for mapping EPHICH resource groups into physical resource elements in a physical resource block used for EPDCCH. The reason for choosing EPDCCH PRB pairs is the possible reuse of demodulation reference signals (DM-RS) of EPDCCH for EPHICH demodulation. EPHICH deployed, for example, on a NCT.

This contrasts which legacy PHICH, which is not able to utilize cell-specific reference signals (CRS) for demodulation but will use DM-RS in a similar way as the EPDCCH and DM-RS based transmission modes of the PDSCH. When mapping EPHICH on EPDCCH PRB pairs, the DM-RS antenna ports number 107 and number 109 in case of normal cyclic prefix or DM-RS antenna ports number 107 and number 108 in case of extended cyclic prefix of the underlying EPDCCH can be directly reused for EPHICH detection without additional overhead of EPHICH specific reference signals for demodulation purposes.

The following assumptions may be made for the EPHICH resource allocation on EPDCCH PRB pairs:

A number of EPHICH groups $N_{EPHICH}$ exist, configured in a cell—for example, the cell 104 served by the eNB 102. An EPHICH group consists of a number of repetitions $N_{REP}$ of EPHICH code blocks, that is, EPHICH resource element groups (EPREGs). An EPREG consists of a number $N_{SF}$ of resource elements, and may carry up to $N_{CH}$ parallel EPHICH channels. CDM (Code division multiplexing) can be applied within a single EPREG enabling the multiplexing of the information for several UEs (up to $N_{CH}$) to a single EPHICH group. It is noted that although the text covers only CDM within a single EPREG in principle other multiplexing schemes such as FDM (Frequency division multiplexing), I/Q multiplexing and TDM (Time Division Multiplexing) can be applied either alone or in combination with CDM. There is at least one EPREG (but in the typical case multiple EPREGs), that is, EPHICH code blocks, per PRB pair, each having a number $N_{SF}$ of resource elements assigned to a particular certain PRB pair. The M EPREGs of the different EPHICH groups on a certain PRB pair may be denoted as $[Q_0, Q_1, \ldots Q_{(M-1)}]$.

Embodiments of the present invention define an EPHICH group, which may share some similar characteristics with those of the PHICH group defined in 3GPP Release 8. The EPHICH group carries up to $N_{CH}$ EPHICH channels, and one suitable number of channels that may be carried is 2, 4 or 8. The EPHICH group may consist of 12 REs divided into 3 (e.g. with SF=4, $N_{CH}$=8) or 6 (with SF=2, $N_{CH}$=4) EPREGs. Different EPHICH groups are mapped onto EPDCCH PRBs in a predetermined manner. The spreading codes may comprise e.g. real valued Walsh codes combined with I/Q multiplexing or complex valued Walsh codes. Codes other than Walsh codes can be considered as well.

An arrangement according to an embodiment of the present invention allocates EPREG resource elements (REs) according to a predefined order within an EPDCCH physical resource block (and within an EPREG). One exemplary preferred rule might be, for example, frequency-first mapping for consecutive resource elements of a single EPREG. An allocation order for allocation of consecutive EPREGs may also be defined, with one exemplary preferred rule being frequency-first time second mapping. The EPHICH structure may be completely independent from the enhanced control channel element (ECCE)/enhanced resource element group (EREG) structure of the underlying EPDCCH whose resources are reused for EPHICH, with a goal of distributing EPHICHs as evenly as possible over the EREGs of EPDCCH, so as to average out the impact of EPHICH on the EPDCCH performance. For example, EPREGs may be either punctured into EPDCCH PRBs. That is, EPREGs replace EPDCCH on some of the REs, thus enabling a dynamic re-use or EPREGs for EPDDCH (in which case no transfer is made) or alternatively an ePDCCH may be code-chain rate matched around EPREGs.

Figure 3A:
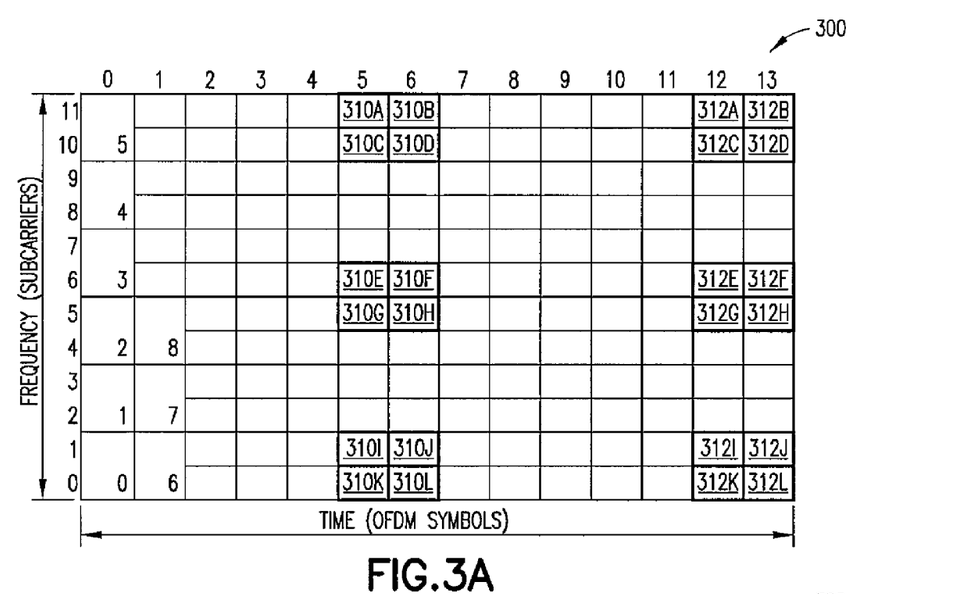
FIGS. 3A, 3B, and 4 illustrate code mapping arrangements according to embodiments of the present invention.
Figure 3B:
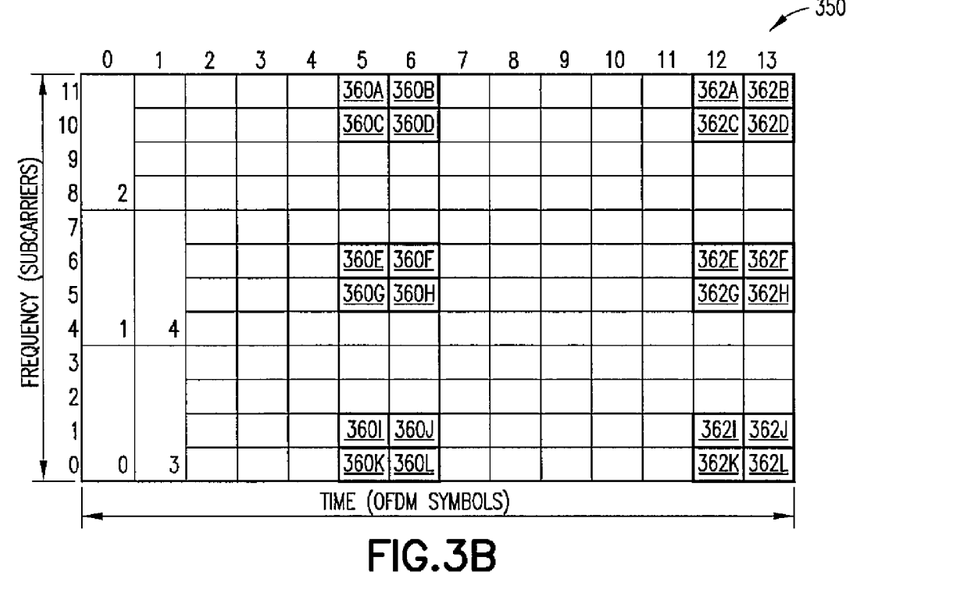

FIGS. 3A and 3B illustrate the mapping of EPREGs onto an exemplary EPDCCH PRB pair. FIG. 3A illustrates the example of a spreading factor (SF) of 2 and 9 EPREGs on an EPDCCH PRB 300, and FIG. 3B illustrates a spreading factor of 4 and 5 EPREGs on an EPDCCH PRB 350. The starting symbol of the EPDCCH in these examples in the physical resource blocks 300 and 350 is orthogonal frequency division multiplexing (OFDM) symbol 0 but could be potentially also start in a later OFDM symbol such as OFDM symbol 1 to 4. The resource elements 310A-310L, 312A-312L, 360A-360L, and 362A-362L are demodulation reference signals (DM-RS) used for EPDCCH and EPHICH decoding and demodulation.

The demodulation reference signals used for EPHICH demodulation may be at least partly the same as the DM-RS used for EPDCCH demodulation. In other words, the EPHICH may be transmitted from the same antenna port or antenna ports as the EPDCCH. Alternatively, EPDCCH may be transmitted from one of the DM-RS antenna ports and the EPHICH is transmitted from the other one.

In addition to the basic structure, one or more embodiments of the invention take the following approach to handling of legacy CRS/CSI-RS (and other signals than EPDCCH/DM-RS) coexisting on the same PRBs:

CRS, CSI-RS (or any known signal) is excluded from the EPREG resources and the indexing within the code block is continued in the resource element after the "avoided" legacy signal, such as CRS/CSI-RS and similar legacy symbols.

If there is no room for the entire EPREG within a single OFDM symbol—for example, due to the presence of reference or other legacy signals, the related resource elements are left unused for EPHICH and the EPHICH indexing in continued on the following OFDM symbol. EPDCCH is also able to be transmitted on these REs.

Figure 4:
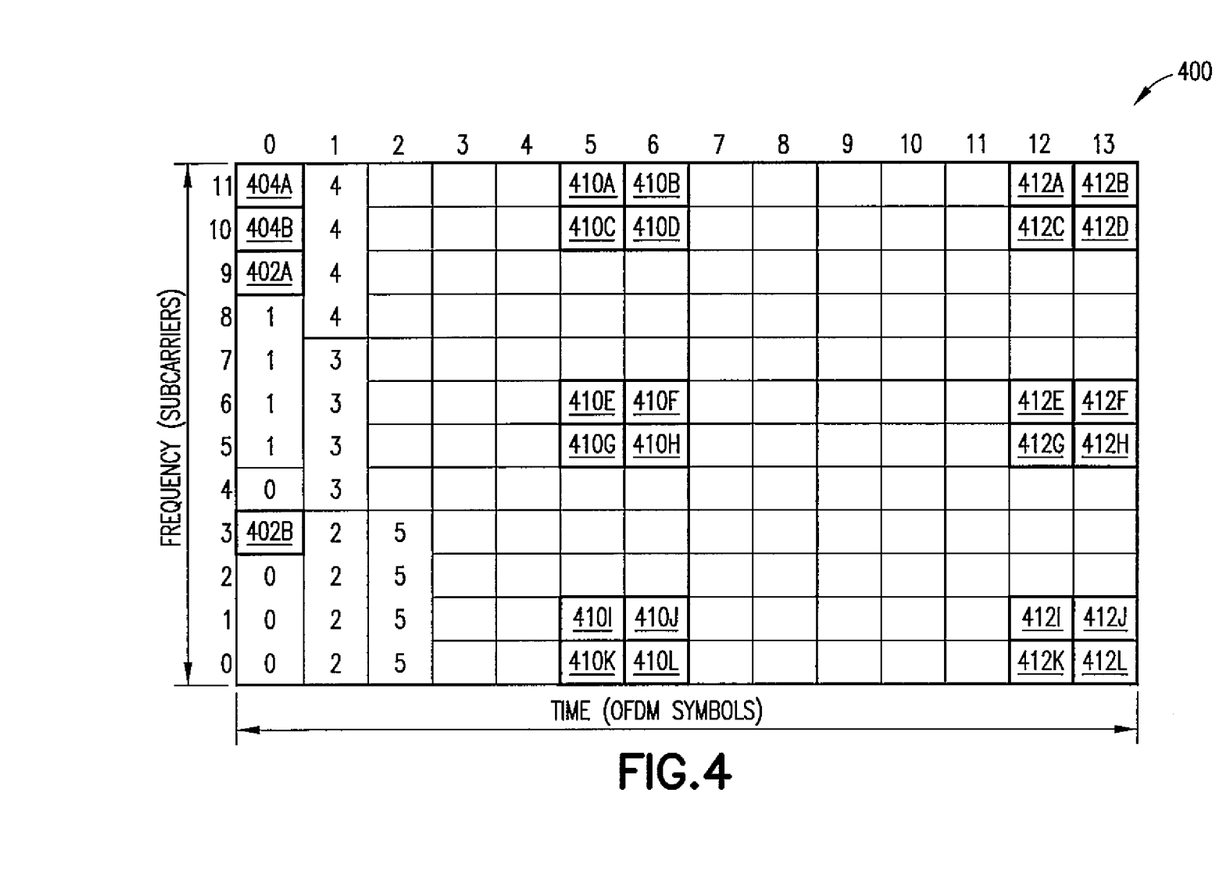

A physical resource block mapped according to these principles is illustrated in FIG. 4. Resource elements 402A and 402B correspond to common cell-specific reference signal (CRS) resource elements, resource elements 404A and 404B correspond to resource elements unused by EPHICH (EPDCCH can still be transmitted on these resources) and resource elements 410A-410L and 412A-410L correspond to demodulation reference signals (DM-RS).

In order to accommodate operation in an environment employing legacy PDCCH, the OFDM symbol first used for EPHICH may be configurable among, for example the following options [0, 1, 2, 3, 4], in the same way as the starting point for EPDCCH is defined in 3GPP TS Release 11. In one approach, a separate specifically designated EPHICH specific starting point configuration may be employed. In an alternative or additional approach, the starting position of EPDCCH (which is configured as part of the EPDCCH set configuration) can be directly reused for EPHICH/EPREGs.

As described here, EPREGs are mapped onto PRB pairs used by EPDCCH. Therefore, one or more embodiments of the invention define use of the remaining REs for EPDCCH after the EPREG mapping, so that the UE can correctly decode the EPDCCH in presence of EPHICH.

A number of alternative approaches may be used:

1. Puncture the actually used EPREGs from EPDCCH

In this approach, the same starting symbol is used for EPDCCH and EPHICH. The REs used for EPREG transmission are punctured from EPDCCH without a need to signal the user device, such as a 3GPP or 3GPP LTE or LTE-A user equipment (UE), and without any particular change affecting the UE. This approach affects the decoding performance of EPDCCH, allows a base station, such as an eNB, to dynamically use EPREGs not required in a particular subframe (for example, a subframe in which a PHICH group and correspondingly its EPREGs are unused) directly for EPDCCH transmission, and this use of otherwise unused resources will help to optimize the overall resource utilization. Moreover, this operation will affect legacy devices that are not aware and capable of EPHICH, and devices conforming to future specifications that are EPHICH aware and capable, in the same way.

2. Another alternative approach is to perform code-chain rate-matching around the configured number of EPHICH groups. Such an approach is generally similar to the handling of CSI-RS and CRS for Rel. 11 EPDCCH—namely, the coded EPDCCH bits are rate matched in addition around the EPREGs. In such a scenario, both the UE and the eNB have information identifying the exact resource element mapping for each EPREG within an EPDCCH PRB pair and therefore code-chain rate matching.

In such a case, if certain EPREGs in a subframe would not be required (as in a case in which the underlying EPHICH group is not used) these resources would be lost for EPDCCH. However, the non-use of such EPREGs reduces transmission power, and allows for use of the transmission power that is thus saved to power boost some other EPREGs in the same OFDM symbol.

Code-chain rate matching around EPHICH would need to be specifically defined for future release UEs being capable of supporting EPHICH—but legacy devices will not be aware of the EPHICH configuration as such. Therefore, this option is in this respect not to be considered as backward compatible when using Release 11 EPDCCH sets, so that different operations would be required for non-EPHICH legacy terminals and EPHICH capable terminals.

3. In a third approach, different starting positions are configured (in terms of OFDM symbol number) for EPDCCH and EPHICH. The eNB configures a later starting symbol for EPDCCH than for EPHICH. Referring to FIGS. 3A and 3B, the eNB might, for example, configure EPHICH to start with OFDM symbol#0, while the EPDCCH, in contrast, would be configured to start with OFDM symbol#3. Such an approach avoids conflict between starting positions, but has the potential to waste resources. For example, in the physical resource blocks 300 and 350 of FIGS. 3A and 3B, six available REs in FIG. 3A and four available REs in FIG. 3B of symbol#2 would go unused. This approach is backwards compatible—meaning it would work for legacy UEs (i.e., not aware of EPHICH) and future UEs (aware of EPHICH).

4. Still another alternative approach is to use a hybrid of the approach directed to puncturing of the EPREGs that are used, and that directed to the use of different starting symbols. Taking the case of the physical resource blocks 300 and 350 the EPDCCH starting point may be defined as OFDM symbol#1 and the potential EPREG $Q_6$ to $Q_8$ in 300 and EPREGs $Q_3$ and $Q_4$ in 350 would need to be punctured from EPDCCH data. Unused resources in OFDM symbols #0 could be used for power boosting. This hybrid mode has some advantages compared to puncturing only, as only a lower number of REs need to be punctured from transmitted EPDCCH downlink control information (DCI) resources and would result in less deterioration of the EPDCCH decoding performance due to the smaller amount of applied puncturing. In addition, in Rel. 11 EPDCCH, the number of eREGs per enhanced control channel element (ECCE) as well as the aggregation level (AL) for user specific search space (USS) depends on the number of available REs for EPDCCH. When puncturing fully, the number of available REs will be substantially overestimated, as all EPREGs in this process are to be considered as "available" for EPDCCH. The hybrid method described above reduces such overestimation substantially. For example, the application of such an approach to the physical resource blocks 300 and 350 of FIG. 3 would result in the availability of only 6 for PRB 300 and 8 for PRB 350—fewer REs than estimated. With puncturing alone, the difference would be 18 REs for PRB 300 and 20 REs for PRB 350.

Figure 5:
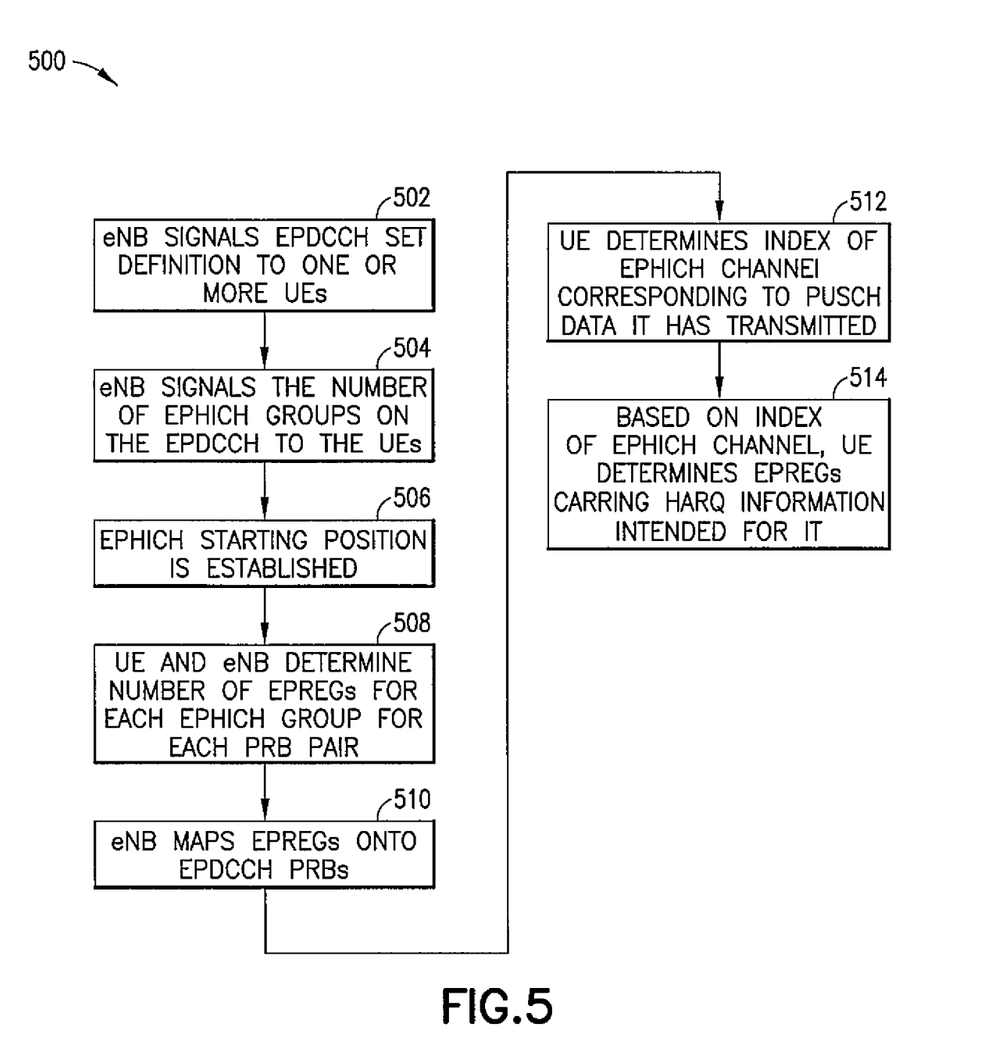
FIG. 5 illustrates a process according to an embodiment of the present invention.

FIG. 5 illustrates a process 500 of mapping of EPHICH groups according to an embodiment of the present invention. The process 500 is presented here in terms of blocks, which in one or more exemplary embodiments may be performed as method steps, but it will be recognized that in such cases the steps need not be performed sequentially.

At block 502, a base station, such as a 3GPP, 3GPP LTE or 3GPP LTE-A eNB, signals an EPDCCH set definition to one or more user devices, such as UEs. Signaling may be accomplished using any desired mechanism, such as Release 11 EPDCCH (which provides only for user specific search space) or a future release EPDCCH common search space.

At block 504, the eNB signals the number of EPHICH groups on the EPDCCH set to the UEs. Such signaling may be accomplished, for example, by RRC configuration or broadcast signaling—for example, through the use of a Master Information Block (MIB).

At block 506, an EPHICH starting position is established. For example, the eNB may signal the EPHICH starting position to the UE—for example, by RRC configuration or broadcasting signaling. Alternatively, the same starting symbol position as for the underlying EPDCCH signaled at step 502 may be used.

At block 508, the UE and eNB determine the number of EPREGs for each EPHICH group for each of the PRB pairs. At block 510, the eNB maps the EPREGs onto the EPDCCH PRBs. The REs used for EPREGs carrying HARQ information may be punctured from EPDCCH. That is, these EPDCCH REs may be replaced with EPREGs. If a particular EPHICH group is not transmitted in a certain subframe, these REs will not be punctured from EPDCCH and will therefore be available for use for EPDCCH transmission. Alternatively, if a different starting position is configured for EPHICH and EPDDCH, only the EPREGs overlapping with EPDCCH resources will be punctured from the EPDCCH DCIs.

At block 512, the UE determines the index of the EPHICH channel including the EPHICH group corresponding to the PUSCH data it has transmitted. At block 514, based on the index of the EPHICH channel, the UE determines the EPREGs carrying HARQ information intended for it.

Figure 6:
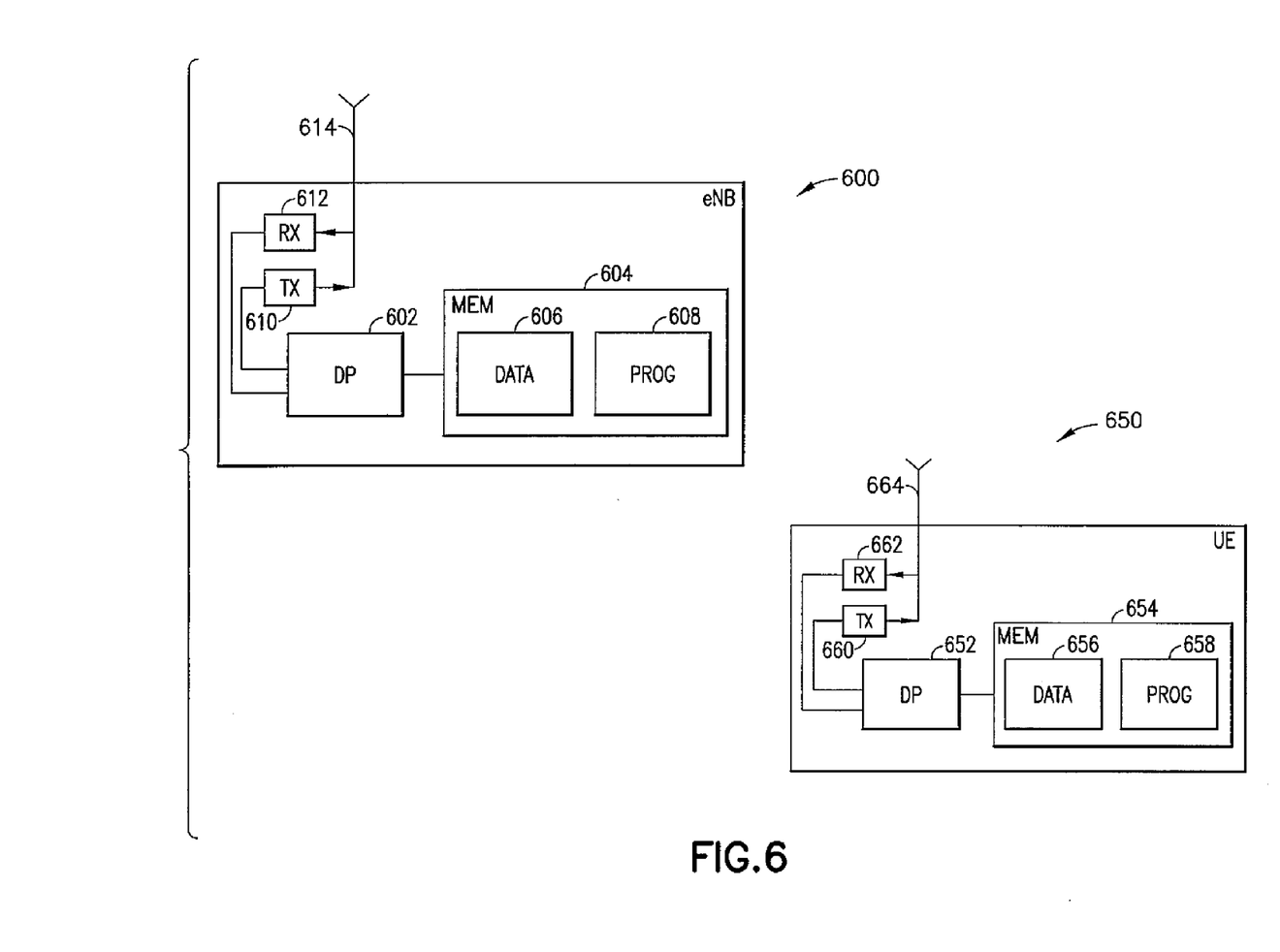
FIG. 6 illustrates exemplary elements that may be used in carrying out embodiments of the present invention.

Reference is now made to FIG. 6 for illustrating a simplified block diagram of a base station, such as an eNB 600, and a user device, such as a UE 650, suitable for use in practicing the exemplary embodiments of this invention. In FIG. 6 an apparatus, such as the eNB 600 is adapted for communication with other apparatuses having wireless communication capability, such as the UE 650.

The eNB 600 includes processing means such as at least one data processor (DP) 602, storing means such as at least one computer-readable memory (MEM) 604 storing data 606 and at least one computer program (PROG) 608 or other set of executable instructions, communicating means such as a transmitter TX 610 and a receiver RX 612 for bidirectional wireless communications with the UE 650 via one or more antennas 614.

The UE 650 includes processing means such as at least one data processor (DP) 652, storing means such as at least one computer-readable memory (MEM) 654 storing data 656 and at least one computer program (PROG) 658 or other set of executable instructions, communicating means such as a transmitter TX 660 and a receiver RX 662 for bidirectional wireless communications with the eNB 600 via one or more antennas 664.

At least one of the PROGs 608 in the eNB 600 is assumed to include a set of program instructions that, when executed by the associated DP 602, enable the device to operate in accordance with the exemplary embodiments of this invention, as detailed above. In these regards the exemplary embodiments of this invention may be implemented at least in part by computer software stored on the MEM 604, which is executable by the DP 602 of the eNB 600, or by hardware, or by a combination of tangibly stored software and hardware (and tangibly stored firmware).

Similarly, at least one of the PROGs 658 in the UE 650 is assumed to include a set of program instructions that, when executed by the associated DP 652, enable the device to operate in accordance with the exemplary embodiments of this invention, as detailed above. In these regards the exemplary embodiments of this invention may be implemented at least in part by computer software stored on the MEM 654, which is executable by the DP 652 of the UE 650, or by hardware, or by a combination of tangibly stored software and hardware (and tangibly stored firmware). Electronic devices implementing these aspects of the invention need not be the entire devices as depicted at FIG. 6 or may be one or more components of same such as the above described tangibly stored software, hardware, firmware and DP, or a system on a chip SOC or an application specific integrated circuit ASIC.

In general, the various embodiments of the UE 650 can include, but are not limited to personal portable digital devices having wireless communication capabilities, including but not limited to cellular telephones, navigation devices, laptop/palmtop/tablet computers, digital cameras and music devices, and Internet appliances.

In one embodiment of the invention, an apparatus comprises at least one processor and memory storing computer program code. The computer program code is configured to, with the at least one processor, cause the apparatus to at least map enhanced physical hybrid automatic repeat request indicator channel (EPHICH) code blocks, denoted as EPHICH resource element groups (EPREGs) in this disclosure, into resource elements within a physical resource block of an EPDCCH.

In another embodiment of the invention, the EPREGs are defined to begin at the first OFDM symbol.

In another embodiment of the invention, the EPREGS are defined to begin in the same OFDM symbol as the underlying EPDCCH.

In another embodiment of the invention, the EPREGS are defined to begin in an OFDM symbol indicated by the eNB to the UE.

In another embodiment of the invention, EPREGs are mapped into adjacent resource elements on the same OFDM symbol within the physical resource block.

In another embodiment of the invention, frequency-first, time-second arrangements are used to map the EPREGS into the resource elements of the physical resource block.

In another embodiment of the invention, frequency-first, time-second arrangements are used, with further rules being applied with the number of REs left on a given OFDM symbol is not enough for an EPREG.

In another embodiment of the invention, EPHICH structure is independent of ECCE/EREG structure of the underlying EPDCCH with which it is sharing physical resource blocks.

In another embodiment of the invention, EPREGs are punctured into EPDCCH PRBs.

In another embodiment of the invention, EPREGs are punctured into EPDCCH PRBs so as to allow dynamic re-use of EPREG for EPDCCH transmission when an EPREG is not needed for EPHICH transmission.

In another embodiment of the invention, EPDCCH is codechain rate matched around EPREGs.

In another embodiment of the invention the EPHICH may be transmitted from the same DM-RS antenna port or DM-RS antenna ports as the EPDCCH on the same PRB.

In another embodiment of the invention, EPDCCH may be transmitted from one DM-RS antenna port and the EPHICH is transmitted from another DM-RS antenna port one on the same PRB.

Various embodiments of the computer readable MEM 604 and 654 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 602 and 652 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above nonlimiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
at least one processor;
memory storing a program of instructions;
wherein the memory storing the program of instructions is configured to, with the at least one processor, cause the apparatus to at least:
define one or more physical resource blocks (PRBs) of an enhanced physical downlink control channel (EPDCCH);
define one or more enhanced physical hybrid automatic repeat request indicator channel (EPHICH) groups each comprising one or more EPHICH resource element groups (EPREGs); and
map the one or more of the EPREGs into the said one or more PRBs of the EPDCCH, with EPREG to resource element (RE) mapping within one PRB of the EPDCCH being accomplished according to a predefined allocation order, wherein the predefined allocation order comprises mapping each of the EPREGs for transmission using consecutive free resource elements of an orthogonal frequency division multiplexing (OFDM) symbol having sufficient free resource elements to accommodate the entire EPREG.

2. The apparatus of claim 1, wherein the EPREG to RE mapping is defined as one of:
beginning at the first orthogonal frequency division multiplexing symbol within each PRB of the EPDCCH,
beginning at the same orthogonal frequency division multiplexing symbol as the EPDCCH, and
beginning at an orthogonal frequency division multiplexing symbol indicated by a base station to a user device.

3. The apparatus of claim 1, wherein the one or more EPREGs are mapped into adjacent REs on the same orthogonal frequency division multiplexing symbol within the PRB of the EPDCCH.

4. The apparatus of claim 1, wherein mapping of the EPREGs into the REs of the PRBs of the EPDCCH is achieved through a frequency-first, time-second criteria.

5. The apparatus of claim 4, wherein the REs to be mapped are supplemented according to predefined rules when the number of REs remaining on a given orthogonal frequency division multiplexing symbol is insufficient for an EPREG.

6. The apparatus of claim 1 wherein EPREGs are punctured into EPDCCH PRBs.

7. The apparatus of claim 1, wherein the predefined allocation order is chosen to provide for even distribution of the used REs of the EPREGs over the enhanced resource element groups of the EPDCCH.

8. The apparatus of claim 1, wherein the EPDCCH is code-chain rate matched around EPREGs.

9. An apparatus comprising:
at least one processor;
memory storing a program of instructions;
wherein the memory storing the program of instructions is configured to, with the at least one processor, cause the apparatus to at least:
receive an enhanced physical downlink control channel (EPDCCH) set configuration comprising one or more physical resource blocks (PRBs);
receive signaling indicating a number of enhanced physical hybrid automatic repeat request indicator channel (EPHICH) groups on the EPDCCH set, each EPHICH group comprising a plurality of EPHICH resource element groups (EPREGs), wherein one or more of the EPREGs are mapped using EPREG to resource element (RE) mapping into one or more PRBs of the EPDCCH, with EPREG to resource element (RE) mapping within one PRB of the EPDCCH being accomplished according to a predefined allocation order, wherein the predefined allocation order comprises mapping each of the EPREGs for transmission using consecutive free resource elements of an orthogonal frequency division multiplexing (OFDM) symbol having sufficient free resource elements to accommodate the entire EPREG;
determine the number of EPREGs for each EPHICH group for each of a plurality of PRB pairs defined by the EPDCCH set configuration;
determine an index of an EPHICH channel including the EPHICH group corresponding to physical uplink shared channel (PUSCH) data associated with the apparatus; and
based on the index of the EPHICH channel, identify EPREGs carrying hybrid automatic repeat request (HARQ) information for the apparatus.

10. The apparatus of claim 9, wherein the EPREGs are defined as one of:
beginning at the first orthogonal frequency division multiplexing symbol of the one or more PRBs of the EPDCCH;
beginning at the same orthogonal frequency division multiplexing symbol as the EPDCCH; and
beginning at an orthogonal frequency division multiplexing symbol indicated by a base station to a user device.

11. The apparatus of claim 9, wherein the one or more EPREGs are mapped into adjacent REs on the same orthogonal frequency division multiplexing symbol within the PRB of the EPDCCH.

12. The apparatus of claim 9, wherein mapping of the EPREGs into the REs of the PRBs of the EPDCCH is achieved through frequency-first, time-second criteria.

13. A method comprising:
defining one or more physical resource blocks (PRBs) of an enhanced physical downlink control channel (EPDCCH);
defining one or more enhanced physical hybrid automatic repeat request indicator channel (EPHICH) groups each comprising one or more EPHICH resource element groups (EPREGs); and
mapping the one or more of the EPREGs into the said one or more PRBs of the EPDCCH, with EPREG to resource element (RE) mapping within PRB of the EPDCCH being accomplished according to a predefined allocation order, wherein the predefined allocation order comprises mapping each of the EPREGs for transmission using consecutive free resource elements of an orthogonal frequency division multiplexing (OFDM) symbol having sufficient free resource elements to accommodate the entire EPREG.

14. The method of claim 13, wherein the EPREG to RE mapping is defined as one of:
beginning at the first orthogonal frequency division multiplexing symbol within each PRB of the EPDCCH;
beginning at the same orthogonal frequency division multiplexing symbol as the EPDCCH; and
beginning at an orthogonal frequency division multiplexing symbol indicated by a base station to a user device.

15. The method of claim 13, wherein the one or more EPREGs are mapped into adjacent REs on the same orthogonal frequency division multiplexing symbol within the PRB of the EPDCCH.

16. The method of claim 13, wherein mapping of the EPREGs into the REs of the PRBs of the EPDCCH is achieved through a frequency-first, time-second criteria.

17. A method comprising:
receiving an enhanced physical downlink control channel (EPDCCH) set configuration comprising one or more physical resource blocks (PRBs);
receiving signaling indicating a number of enhanced physical hybrid automatic repeat request indicator channel (EPHICH) groups on an EPDCCH set, each EPHICH group comprising a plurality of EPHICH resource element groups (EPREGs), wherein one or more of the EPREGs are mapped using EPREG to resource element (RE) mapping into one or more PRBs of the EPDCCH, with EPREG to resource element (RE) mapping within one PRB of the EPDCCH being accomplished according to a predefined allocation order, wherein the predefined allocation order comprises mapping each of the EPREGs for transmission using consecutive free resource elements of an orthogonal frequency division multiplexing (OFDM) symbol having sufficient free resource elements to accommodate the entire EPREG;
determining the number of EPREGs for each EPHICH group for each of a plurality of PRB pairs defined by the EPDCCH set configuration;
determining an index of an EPHICH channel including the EPHICH group corresponding to physical uplink shared channel (PUSCH) data; and
based on the index of the EPHICH channel, identifying EPREGs carrying hybrid automatic repeat request (HARQ) information.

18. The method of claim 17, wherein the EPREGs are defined as one of:
beginning at the first orthogonal frequency division multiplexing symbol of the one or more PRBs of the EPDCCH;
beginning at the same orthogonal frequency division multiplexing symbol as the EPDCCH; and
to begin at an orthogonal frequency division multiplexing symbol indicated by a base station to a user device.

19. The method of claim 17, wherein the one or more EPREGs are mapped into adjacent REs on the same orthogonal frequency division multiplexing symbol within the PRB of the EPDCCH.

20. A non-transitory computer readable medium storing a program of instructions, execution of which by a processor configures an apparatus to at least:
define one or more physical resource blocks (PRBs) of an enhanced physical downlink control channel (EPDCCH);

define one or more enhanced physical hybrid automatic repeat request indicator channel (EPHICH) groups each comprising one or more EPHICH resource element groups (EPREGs); and map the one or more of the EPREGs into the said one or more PRBs of the EPDCCH, with EPREG to resource element (RE) mapping within one PRB of the EPDCCH being accomplished according to a predefined allocation order, wherein the predefined allocation order comprises mapping each of the EPREGs for transmission using consecutive free resource elements of an orthogonal frequency division multiplexing (OFDM) symbol having sufficient free resource elements to accommodate the entire EPREG.

* * * * *